INVENTORS.
RAYMOND J. ROGERS
THOMAS B. MICHAELS

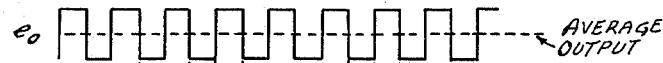
Fig. 4a
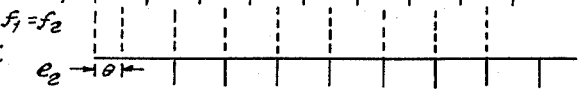
Fig. 4b
Fig. 4c
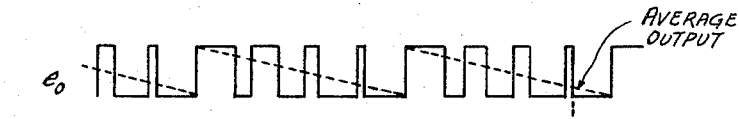
Fig. 4d
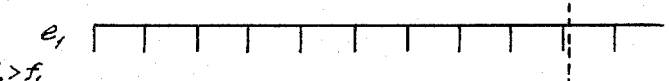
Fig. 4e
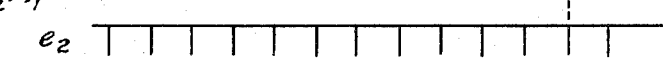
Fig. 4f
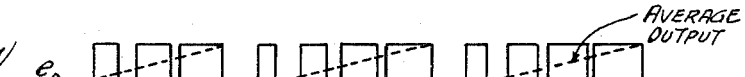
Fig. 4g
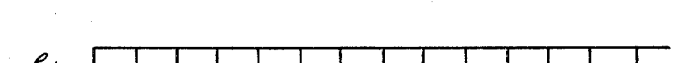
Fig. 4h
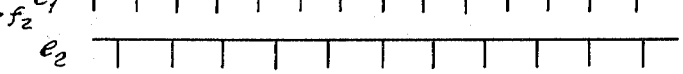
Fig. 4i

| | $2^6$ | $2^5$ | $2^4$ | $2^3$ | $2^2$ | $2^1$ | $2^0$ |
|---|---|---|---|---|---|---|---|
| ÷ FACTOR | 64 | 32 | 16 | 8 | 4 | 2 | 1 |
| 110 | 1 | 1 | 0 | 1 | 1 | 1 | 0 |
| 111 | 1 | 1 | 0 | 1 | 1 | 1 | 1 |
| 112 | 1 | 1 | 1 | 0 | 0 | 0 | 0 |
| 113 | 1 | 1 | 1 | 0 | 0 | 0 | 1 |
| 114 | 1 | 1 | 1 | 0 | 0 | 1 | 0 |
| 115 | 1 | 1 | 1 | 0 | 0 | 1 | 1 |
| 116 | 1 | 1 | 1 | 0 | 1 | 0 | 0 |
| 117 | 1 | 1 | 1 | 0 | 1 | 0 | 1 |
| 118 | 1 | 1 | 1 | 0 | 1 | 1 | 0 |
| 119 | 1 | 1 | 1 | 0 | 1 | 1 | 1 |

INVENTORS.
RAYMOND J. ROGERS
THOMAS B. MICHAELS

United States Patent Office 3,500,225
Patented Mar. 10, 1970

3,500,225
SYNTHESIZER FOR STEP OR
VERNIER OPERATION
Raymond J. Rogers and Thomas B. Michaels, Rochester,
N.Y., assignors, by mesne assignments, to the United
States of America as represented by the Secretary of
the Navy
Filed Nov. 16, 1967, Ser. No. 683,512
Int. Cl. H03b 3/04
U.S. Cl. 331—8                                          1 Claim

ABSTRACT OF THE DISCLOSURE

A synthesizer for use in high frequency single sideband radio equipment that is operable for tuning among several very small frequency steps of a very narrow band at very high frequency, for example, tuning among several consecutive frequency steps 100 cycles apart at about 7.1 megacycles per second and to lock in at the selected frequency step, and in the alternate to tune continuously over a band of somewhat wider limits. The synthesizer includes an oscillator that is voltage tunable over a band about 10 kilocycles wide, for example, 110–119 kilocycles and is of the type that includes voltage variable capacitor means for tuning within the band. The voltage for tuning the oscillator is delivered by a flip-flop phase detector which compares a reference pulse train of one kilocycle per second, for example, and a pulse train of pulse repetition frequency that is continuously equal to the oscillator frequency divided by a selected one of several consecutive whole number division factors so as to equal one kilocycle per second. Oscillator tuning voltage coupled from the phase detector to the oscillator operates to tune and lock the frequency of the pulse train input to the flip-flop phase detector that derives from the oscillator to the frequency of the reference pulse train. The sinusoidal output of the voltage tuned oscillator is divided by ten, then mixed with a constant frequency, for example, 7.089 megacycles per second. A filter selects the sum frequency for the synthesizer output.

SUMMARY OF THE INVENTION

A phase locked oscillator is employed to provide discrete tuning increments, e.g. 100 cycles per second over a selected band, e.g. 1,000 cycles wide. These specific tuning increments are not essential to the invention being convenient choices. The phase-locked oscillator can be operated in an unlocked mode over the same band or with somewhat widened limits. In the locked mode, the oscillator is locked at frequency steps 1,000 cycles apart. The output frequency of the oscillator is divided by a factor of 10 to provide the desired 100 cycle tuning increments. The output of the divider is injected into a mixer along with the selected high frequency, e.g. 7.089 megacycles and a filter selects the sum, or difference, frequency. The phase-locked oscillator circuit includes a binary phase detector and a selective divider circuit. In the locked mode, the oscillator is selectively locked at one of several consecutive 1,000 cycle increments of frequency within the oscillator tuning band. The divider is set for a division factor such the division factor multiplied by 1,000 cycles is equal to the desired oscillator frequency. When the oscillator is in lock the output of the divider is 1,000 cycles. The binary phase detector receives the output of the divider and a reference standard of 1,000 cycles. The output of the binary phase detector drives an inverter amplifier which provides a large error voltage swing and is coupled into a filter which integrates the pulse type waveform from the inverter and provides a D.C. control voltage to the oscillator's reactance control, i.e., voltage variable capacitors of the type marketed under the name Varicaps. The control voltage changes till it has tuned the oscillator to the desired frequency and then maintains it in lock. The divider is set by means of binary code inputs straightforwardly implemented by means of a programmer or multiple contact type of switch for directing voltages representing the alternate possibilities to the binary code inputs. In addition to operating in a locked tuning mode, the circuit can be set to vernier function to operate in the continuous tuning mode over at least the same band as in the locked tuning mode. This is accomplished by disabling the divider and phase lock means and at the same time activating a potentiometer controlled voltage and applying this voltage to the other side of the variable voltage capacitors. An advantage of the choice of tuning modes is to simplify and ensure accurate tuning to preselected frequencies or when necessary to enable the operator to track in vernier a transmitting system that does no possess the same frequency and accuracy as is afforded by the locked mode.

BACKGROUND OF THE INVENTION

This invention relates to single sideband radio equipment. Operating frequency is in the megacycle range while single channels are very narrow. Tuning is difficult and frequency drift complicates matters. Circuitry intended to facilitate tuning developed heretofore has been complex and has not served the purpose satisfactorily.

An object of this invention is to provide a superior tuning arrangement for single sideband equipment.

Other objects and advantages will appear from the following description of an example of the invention, and the novel features will be particularly pointed out in the appended claim.

In the accompanying drawings:

FIG. 4a through FIG. 4i are graphical showings of the operation of the binary phase detector under three different conditions;

Figure 1:
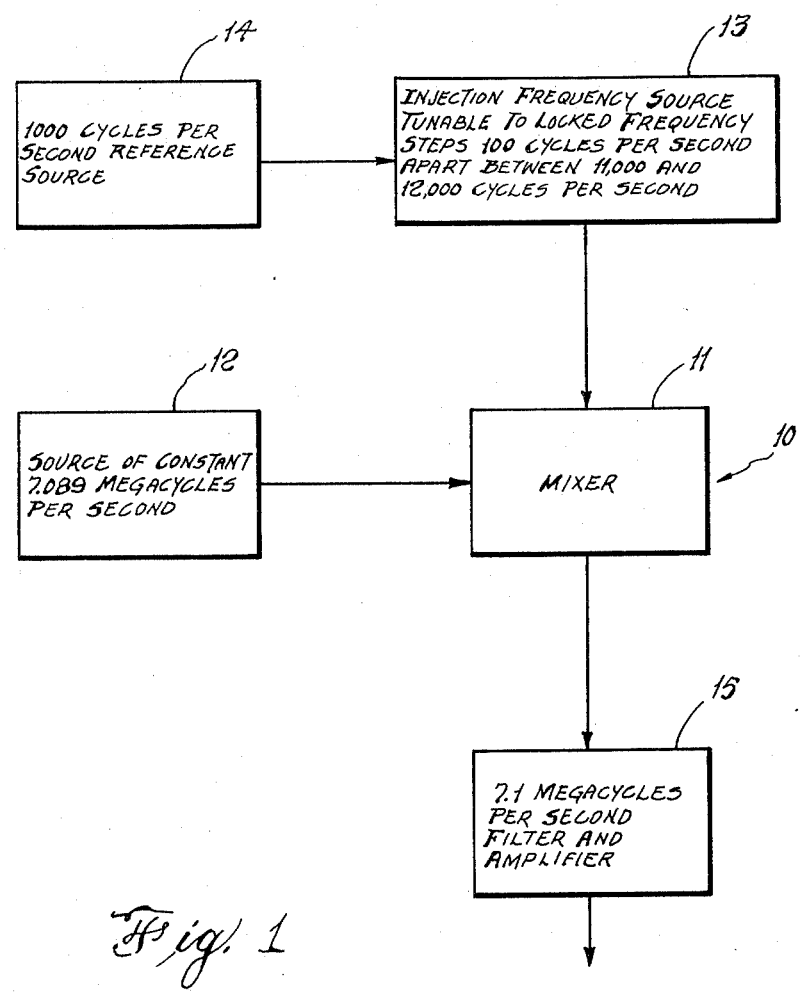
FIG. 1 is a block diagram that illustrates the invention in its broader aspects.

A synthesizer 10 embodying the teachings of this invention is shown in block form in FIG. 1 and includes a mixer 11 having two inputs, one of which is a constant frequency in the megacycle range, e.g. 7.089 megacycles per second and the other a tunable injection frequency on the order of 11–12 kilocycles per second. The frequencies specified are cited by way of example and do not constitute limitations in the invention. The constant frequency is obtained from a source 12 that may be synthesizer circuitry of single sideband equipment or from any convenient source. The injection frequency source 13 that supplies the other input to the mixer 11 is operable in a locked step tuning mode over a frequency range on the order of eleven to twelve kilocycles per second, in discrete tuning increments of 100 cycles. A 1,000 cycle per second reference source 14 is coupled to the injection frequency source. Filter and amplifier circuitry 15 coupled to the mixer 11 selects the sum frequency of the inputs to the mixer for the output of synthesizer 10.

Figure 2:
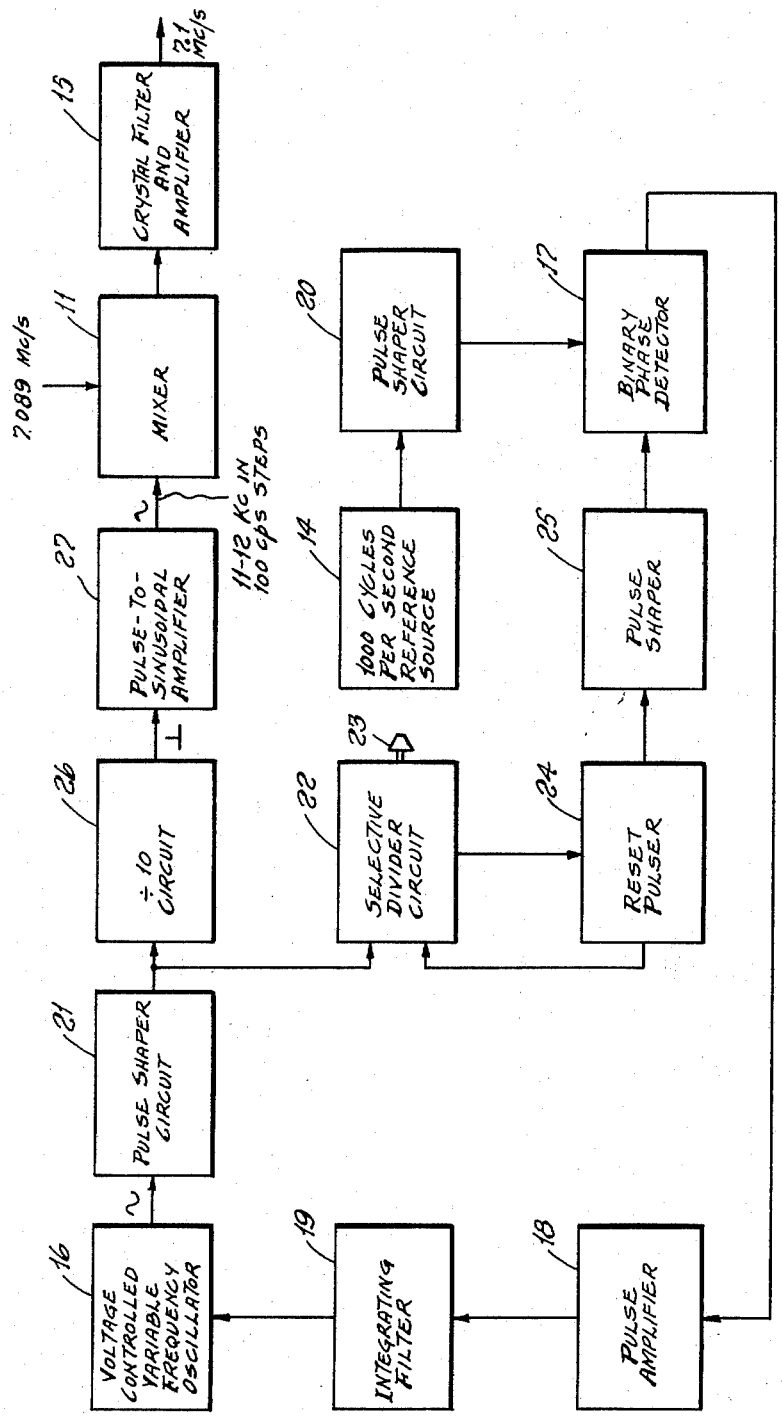
FIG. 2 is a more detailed block diagram of a preferred embodiment of the invention.

The injection frequency source illustrated in block form in FIG. 2 includes a variable frequency oscillator 16 of the type having variable voltage capacitors for tuning the oscillator. The D.C. voltage for tuning and locking the frequency of oscillator 16 is provided as a function of frequency difference between the two inputs to the phase detector by binary phase detector 17, amplifier 18 for the pulse type output of the binary phase detector, and integrating filter 19. One of the inputs to the binary phase detector 17 is a reference pulse train of a constant pulse repetition frequency, for example, 1,000 cycles per second obtained from pulse shaper circuit 20 that converts the sinuosidal 1,000 cycles per second input from reference source 14 to a pulse train of the same pulse repetition frequency and having suitable pulse height and pulse length characteristics. The other input to binary phase detector 17 is a pulse train of variable pulse repetition frequency which changes directly with the oscillator frequency. A pulse shaper circuit 21 coupled to the output of the oscillator 16 converts the sinusoidal output of the oscillator to a pulse train of corresponding pulse repetition frequency which pulse train is delivered to a selective divider circuit 22 having selection switch device 23 for delivering a pulse train corresponding to the oscillator frequency divided by the numerical factor selected by setting switch device 23. Reset pulser 24 responds to each output pulse from divider 22 and delivers an output pulse to pulse shaper 25 and resets the divider circuit 22 following each group of pulses from pulse shaper circuit 21 equal in number to the division factor for which switch 23 is set. The oscillator is locked to the frequency corresponding to 1,000 cycles multiplied by the division factor to which the switch 23 is set.

A decode divider circuit 26 converts the 1,000 cycle steps of the oscillator to 100 cycle steps. A pulse-to-sinusoidal amplifier 27 deliveries to mixer 11 the tuned injection frequency as shown in FIG. 1.

Figure 3:
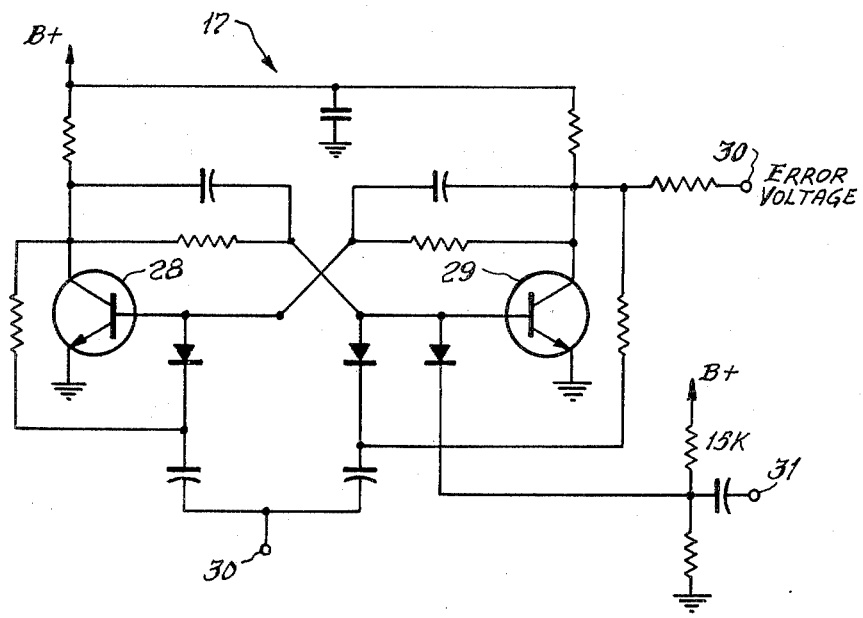
FIG. 3 is a circuit diagram of a binary phase detector that may be included in the embodiment shown in FIG. 2.

A binary phase detector 17 suitable for the circuit shown in FIG. 2 is shown in FIG. 3. Basically the phase detector circuit 17 is a flip-flop having transistors 28 and 29. Pulses from pulse shaper 25 are coupled into terminal 30 and 1,000 cycle reference pulses from pulse shaper 20 are coupled into terminal 31. In the absence of pulse inputs transistor 28 conducts and transistor 29 is cut off. Reference pulses coupled to terminal 30 have no effect when transistor 29 is cut off. Each pulse coupled into terminal 30 operates to switch the circuit regardless of which transistor is in the conducting state. If a pulse arrives on terminal 31 while transistor 29 is in the conducting state, the circuit is switched. If no pulse arrives on terminal 31 between two successive pulses on terminal 27, the circuit is switched by both pulses to terminal 30 and a succeeding pulse on terminal 29 is without effect. This is shown in FIGS. 4a through 4i. The reference pulse train of 1,000 cycles per second is shown in FIG. 4b, FIG. 4e, FIG. 4h, and is designated $e_1$. The pulse train which derives from the oscillator is shown in FIG. 4c, FIG. 4f, FIG. 4i and is designated $e_2$. FIG. 4a shows the output of the phase detector where successive pulses are identical, corresponding to when the frequencies of $e_1$ and $e_2$ are equal, and phase angle between pulse trains being one-half the pulse period. Under those conditions the filter 19 provides an output voltage that is essentially constant, i.e. pulsation is minimal as represented by the broken line in FIG. 4a. Where the phase angle $\theta$ between the pulse trains $e_1$ and $e_2$ is different than shown in FIG. 4c, the pulsating component in the average output is greater. The circuit operates to minimize the pulsation by causing the phase angle to be changed to that in FIG. 4c. FIG. 4d shows the pulse output of the phase detector when the frequency of pulse train $e_2$ derived from the oscillator is greater than the frequency of the reference pulse train. Each of the successive pulses of the pulse train $e_2$ switches the phase detector so that each of these pulses is coincident with a leading edge or trailing edge of the output of the phase detector. However, each of the successive pulses of the reference pulse train $e_1$ can only switch the transistor 29 from conducting to non-conducting state. Therefore as shown by FIG. 4d and FIG. 4e the pulses of reference pulse train $e_1$ are coincident with the leading edge of an output pulse except where a reference pulse is delivered between the leading and trailing edges of a pulse at the output of the phase detector. The pulse-to-pulse averaged output of phase detector is shown in broken lines in simplified form for explanatory purposes to show the generally pulsating character of averaged output which has a generally negative slope. In FIG. 4g, FIG. 4h, and FIG. 4i, there is shown the converse situation wherein the frequency of the pulse train $e_2$ derived from the oscillator is less than the frequency of the reference pulse train. In the latter circumstance the slope of the generally sawtooth wave-form of the pulse-to-pulse averaged output is generally positive. In FIG. 3, the output of the phase detector is derived at the collector of the transistor 29 and delivered to amplifier 18.

If the pulse amplifier 18 is omitted and a positive output voltage is required for causing a decrease in oscillator frequency, the output is taken at the collector of transistor 28; the output is taken at the collector of transistor 30 where a positive voltage is desired to increase the oscillator frequency. Where the amplifier 18 is included, the other phase detector output is used since there is 180° inversion of the signal in the amplifier.

Figure 5:
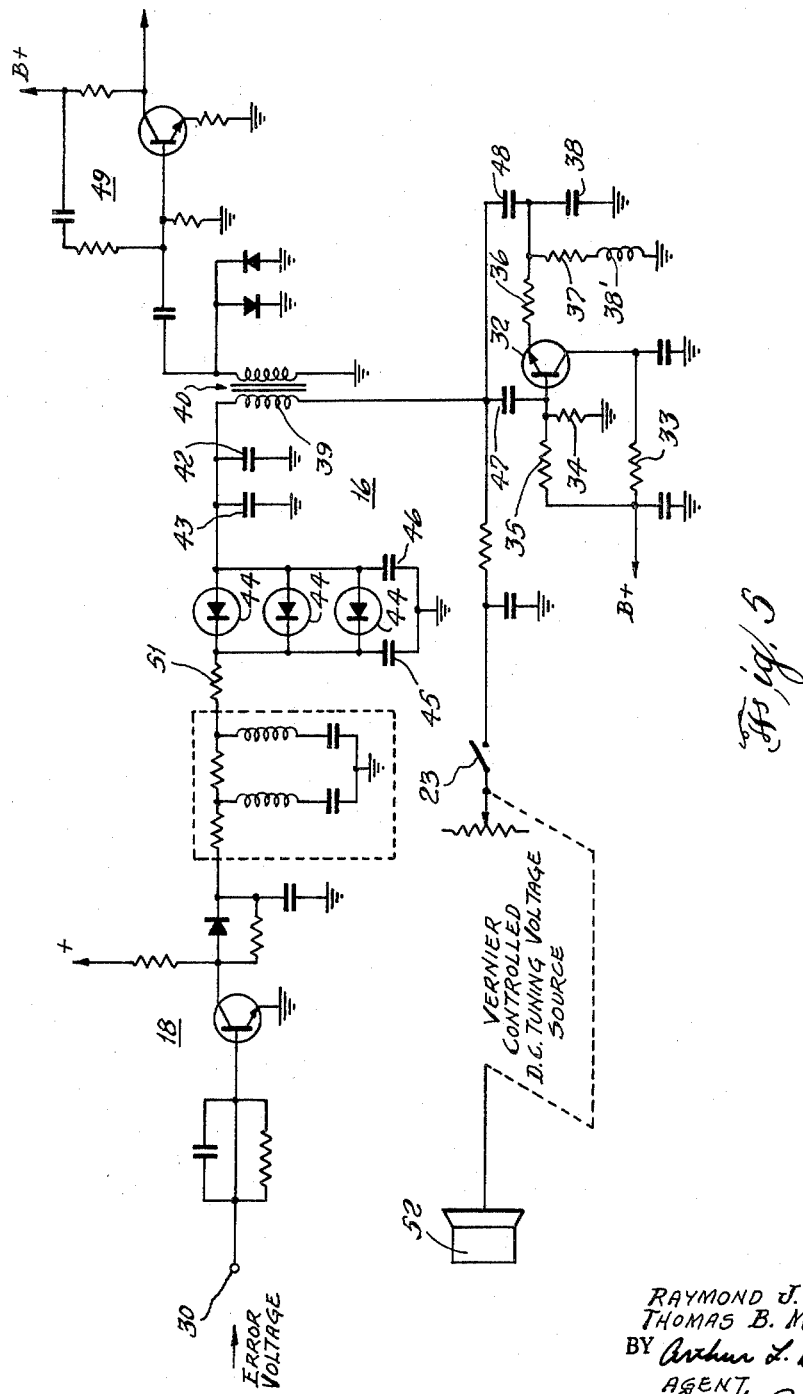
FIG. 5 is a simplified circuit diagram of an oscillator for the embodiment in FIG. 2 plus associated circuitry.

In FIG. 5, there is shown a simplified circuit arrangement of the voltage-controlled variable frequency oscillator 16 having a transistor 32, a collector resistor 33, a resistive voltage dividers 34 and 35 for base bias, and an emitter circuit including resistor 36, resistor 37 and a choke 38 for blocking A.C. from the B+ supply; an A.C. bypass capacitor 38 is connected across resistor 37 and choke 38. Resistor 37 operates as a ringing damper. The resonant circuit of the oscillator includes the primary 39 of audio transformer 40, parallel capacitors 42 and 43, and parallel connected voltage-variable tuning capacitors 44 coupled to ground by capacitors 45 and 46. The transformer primary is coupled to the base of transistor 32 by capacitor 47 and to junction of resistors 36 and 37 in the emitter circuit by capacitor 48. Pulse shaping amplifier circuit 21 is coupled to the secondary of transformer 40. The pulse train output of binary phase detector of FIG. 3 is coupled through amplifier 18, filter circuit 19, resistor 51, to the variable voltage capacitors 44. When the uniform pulse output shown in FIG. 4a is delivered, the voltage delivered to the variable voltage capacitors is essentially constant; when the output is as shown in FIG. 4d or FIG. 4g the voltage at the output of the filter 19 varies till the condition shown in FIG. 4a is attained. For venier continuous tuning instead o fstep tuning over the same band or a band whose limits are further apart, the programmer switch 23 has one position in which no voltage is supplied to the divider and to the amplifier 18, and vernier control is activated. In all other positions of the programmer switch 23, the vernier is disabled and a programmed code of voltages are supplied to the divider.

Figures 6, 7:
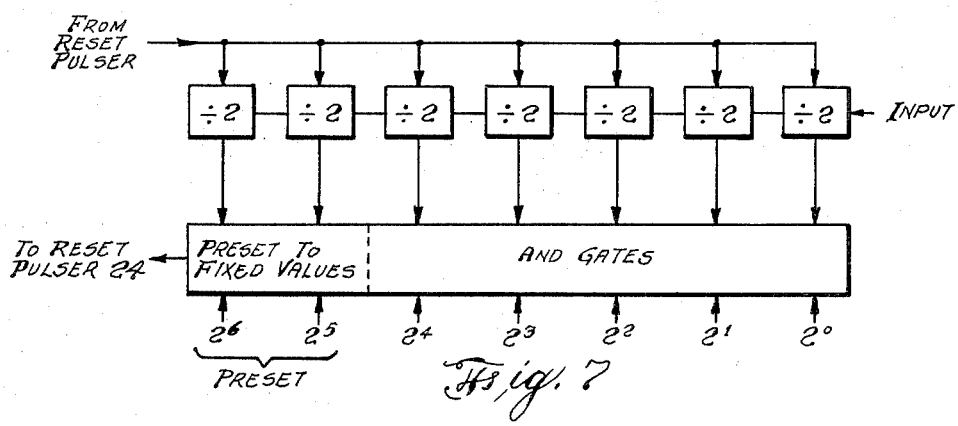
FIG. 6 is a chart of binary codes for numerical factors 110 through 119.
FIG. 7 is a selective divider circuit for the embodiment shown in FIG. 2.

Assuming the oscillator is tuned over the band 110–119 kilocycles per second in 1,000 cycle steps, the division factor in binary terms required for providing a 1,000 cycle input to the binary phase detector at each of the frequency steps is shown in FIG. 6. The circuit shown in block form in FIG. 7 which basically includes flip-flops and AND gates is capable of providing the division factors 110 through 119. The binary code for the selected division factor is programmed into the inputs $2^0$ through $2^6$ as a "0" or "1." A train of pulses into the input binary eventually sets the binaries outputs in those states where these outputs to the AND gates are in the same pattern of "0" and "1" as was set on the inputs $2^0$ through $2^6$. Since the two inputs to all of the "AND" gates are the same, "0" or "1," an output pulse is delivered to pulser 24 which substantially instantaneously delivers a reset pulse to all the binaries before the succeeding pulse arrives at the input of the first binary. Since all of the division factors call for a code that includes a "1" input to the $2^5$ and $2^6$ inputs to the "AND" gates it is more convenient to preset these two inputs.

The described embodiment is operable to provide discrete tuning increments, e.g. 100 cycles per second in a single sideband radio equipment operating at several megacycles with the stability and accuracy of the frequency reference and in addition to provide option of vernier tuning of a wider band than in the step-tuning mode of operation.

It will be understood that various changes in the details, materials, and arrangements of parts (and steps), which have been herein described and illustrated in order to explain the nature of the invention, may be made by those skilled in the art within the principle and scope of the invention as expressed in the appended claim.

We claim:

1. A synthesizer for use in high frequency single sideband radio equipment that is operable for tuning among several contiguous, very narrow band frequency steps comprising:

a binary phase detector having two inputs for two pulse trains and providing essentially constant D.C. voltage output when the input pulse trains are of identical frequency and for providing pulsating voltage when the pulse train frequencies are unequal and wherein the polarity of the pulsating component is related to whether the pulse train to one of the inputs has the higher frequency or lower frequency, means for providing a 1000 cycle per second constant frequency pulse train to one of said inputs, pulse train frequency divider means coupled to the other input and selectively operable to provide any one of a plurality of consecutive whole number division factors near 100, a continuously tunable oscillator having voltage variable capacitor tuning means for tuning over a frequency band that includes the numeral products of the frequency of the constant frequency pulse train and the lowest and the highest division factors, respectively, of the pulse train frequency divider means, pulse shaper means coupled to the output of the oscillator and to the input of the pulse train frequency divider means for converting the sinusoidal output of the oscillator to a pulse train at the oscillator frequency, means for coupling the voltage variable capacitor tuning means to the output of the binary phase detector, to tune the oscillator to that frequency at which the two pulse train inputs to the binary phase detector are of identical frequency, a pulse train divider circuit coupled to the output of the means that is coupled to the output of the oscillator, for dividing by ten the frequency of the pulse train output therefrom, to provide output frequency steps that are 100 cycles per second apart, means for converting a pulse train input to a sinusoidal output of the same frequency, coupled to the output of the divider circuit that provides the frequency steps that are 100 cycles per second apart, and a mixer coupled to the output of the means for converting a pulse train input to a sinusoidal output of the same frequency, means providing to the mixer a fixed frequency input on the order of several megacycles per second, and filter-amplifier means coupled to the output of the mixer for delivering one of the sum and difference frequencies.

References Cited

UNITED STATES PATENTS

| | | | |
|---|---|---|---|
| 2,595,608 | 5/1952 | Robinson et al. | 331—11 |
| 2,963,648 | 12/1960 | Baskin et al. | 331—27 |
| 3,130,376 | 4/1964 | Ross | 331—18 |
| 3,353,112 | 11/1967 | Richards | 331—18 |
| 3,372,339 | 3/1968 | Harrison et al. | 331—14 |

JOHN KOMINSKI, Primary Examiner

U.S. Cl. X.R.

331—25, 27, 36, 16